United States Patent
Ballew

[11] 3,905,118
[45] Sept. 16, 1975

[54] FILE GUIDE
[75] Inventor: James S. Ballew, Gladstone, Oreg.
[73] Assignee: Omark Industries, Inc., Portland, Oreg.
[22] Filed: Jan. 28, 1974
[21] Appl. No.: 437,501

[52] U.S. Cl. .................... 33/202; 76/25 A; 76/36
[51] Int. Cl.² .......................................... B23D 63/10
[58] Field of Search ............ 33/202; 76/36, 25 A, 31

[56] References Cited
UNITED STATES PATENTS

| | | | |
|---|---|---|---|
| 2,415,137 | 2/1947 | Johnson | 33/202 X |
| 2,822,707 | 2/1958 | Gommel | 76/36 |
| 3,055,238 | 9/1962 | Hazzard | 76/36 |
| 3,327,567 | 6/1967 | Penberthy | 76/36 |
| 3,670,600 | 6/1972 | Arff | 76/36 |

Primary Examiner—William D. Martin, Jr.

[57] ABSTRACT

A reference plate has two depending guide lugs. The guide lugs have aligned openings adapted to receive and slideably guide a round file. The file guide is placed over a cutting link of a saw chain with the guide lugs straddling the chain and with the file placed in the gullet of the cutting link. The reference plate rests on the top plate and depth gauge of the cutting link to properly locate the height of the file. A central hole through the reference plate enables the operator to view the file and thus align it with the cutting edge of the cutting link.

5 Claims, 7 Drawing Figures

FILE GUIDE

HISTORY

This invention relates to a file guide for locating a file to properly sharpen the cutting links of a saw chain.

It is well recognized that saw chain sharpening is important but relatively difficult especially for the casual user of a chain saw and a great deal of effort has been made by the industry to provide means for making this task easier. Various forms of file holders and file guides are available. These range from the complex and cumbersome device shown in U.S. Pat. No. 2,818,752 to the very simple guide shown in U.S. Pat. No. 3,365,805.

These prior efforts have been helpful and yet sharpening saw chain remains a most objectionable task required of a chain saw user. It is thus an object of the present invention to provide a device for further simplifying the sharpening process. Very briefly, the preferred device of the present invention includes a reference plate adapted to rest on top of the saw chain cutter's top plate and depth gauge. Depending lugs straddling the cutting link have aligned openings for receiving a long round file and by following very simple instructions enables a user to work the file back and forth within the guide to properly sharpen the chain.

A more complete understanding of the invention will be obtained by reference to the following detailed description and drawings wherein.

Figure 5:
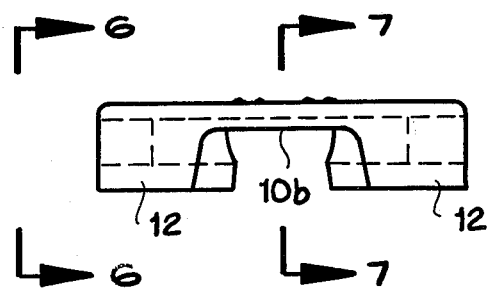
FIG. 5 is a side view of the file guide.
Figure 6:
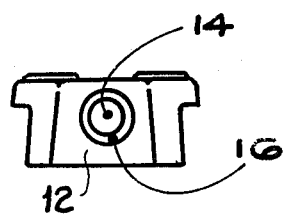
Figure 7:
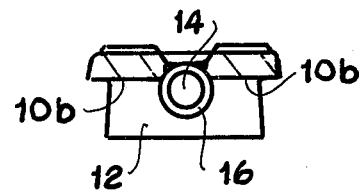

FIGS. 6 and 7 are views taken on section lines 6-6 and 7-7 of FIG. 5.

Referring to the drawings, a flat elongated reference plate 10 has depending lug portions 12 located on the bottom adjacent the ends of the reference plate 10. The lugs 12 are spaced from each other and form a chain receiving channel between them. Openings 14 in the lugs are in alignment with each other and wear resistant metal collets 16 line these openings (as it is preferred that a less expensive and light weight plastic be used for plate and lugs).

In operation, the bottom surface 10b of the plate 10 is layed on the cutting link 18 of a saw chain and bridges between the top plate 20 and depth gauge 22 of the cutting link 18. A round file 24 (previously passed through the aligned collets 16) is nested in the gullet 25 between the depth gauge 22 and top plate 20. The file is then aligned with the cutting edge 26 (the leading edge of the top plate) and the file is worked back and forth against the cutting edge 26 (in practice, filing is accomplished while the file is moved forwardly with pressure released in the return stroke).

Figure 1:
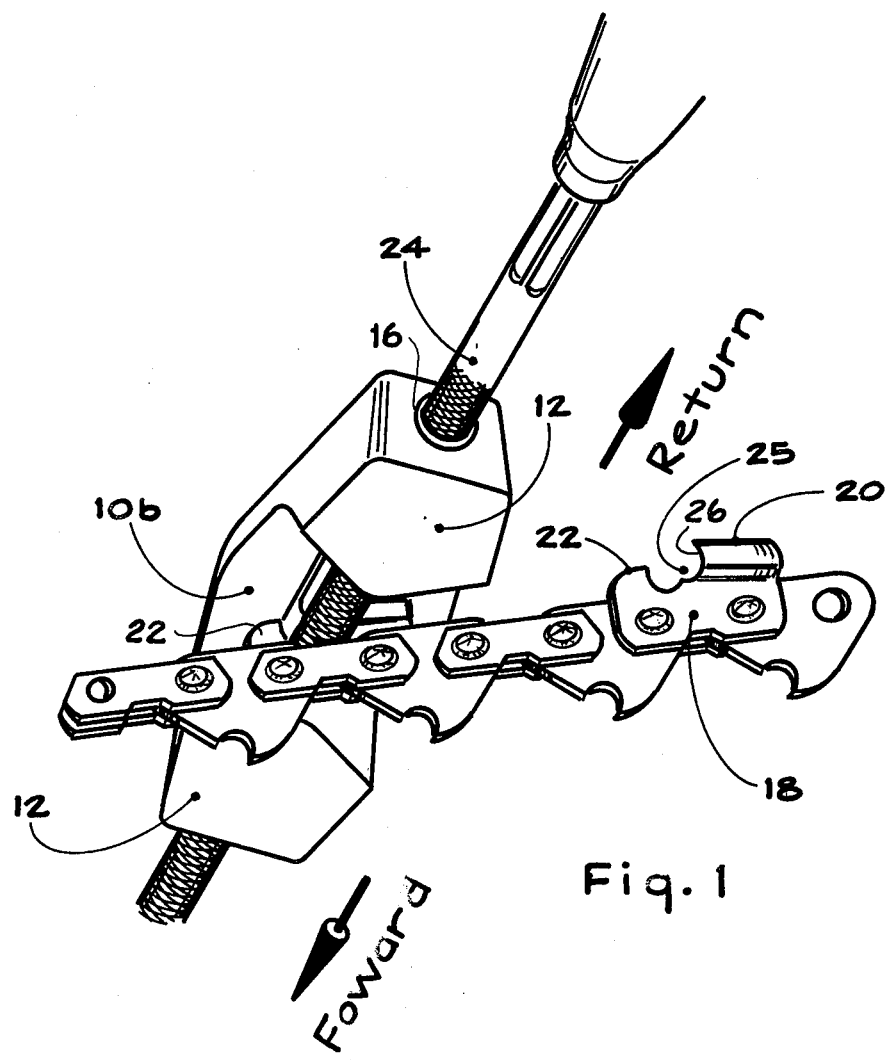
FIG. 1 is a perspective view taken from the underside of a saw chain, file for sharpening the saw chain cutters, and file guide incorporating the present invention.
Figure 2:
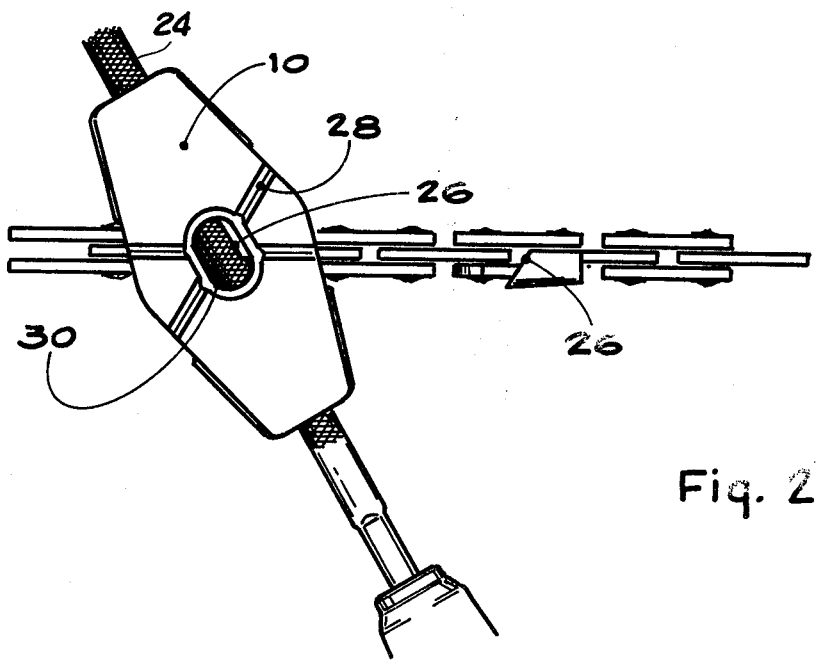
FIG. 2 is a top view of the saw chain file and file guide of FIG. 1.
Figure 3:
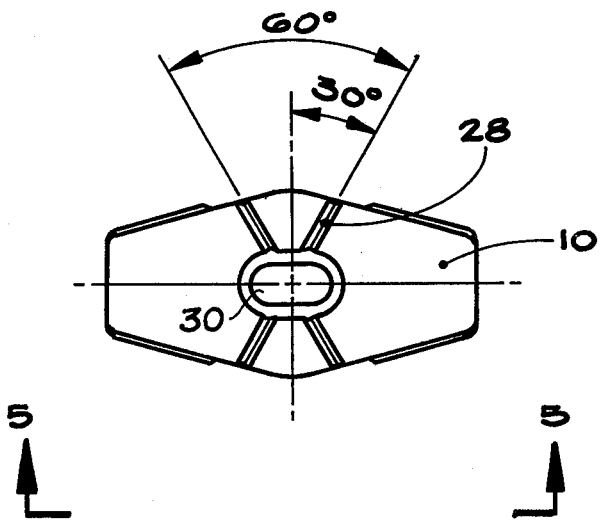
FIG. 3 is a top view of the file guide only of FIGS. 1 and 2.
Figure 4:
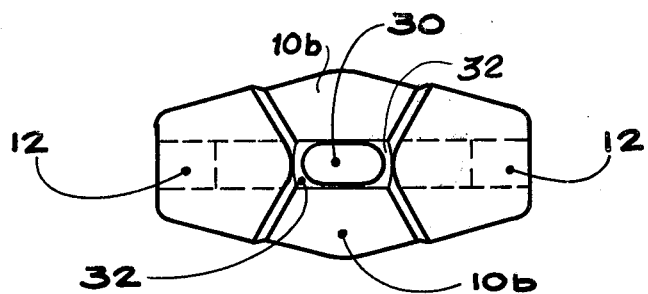
FIG. 4 is a bottom view of the file guide.

Whereas the angle at which the cutting edge 26 is swept rearwardly generally conforms to industry wide standards, reference marks 28 are placed on the top of the reference plate 10 to aid the user in lining up the file. (Instructions accompanying the saw chain will explain what angle to set the file.) It is, however, considered advantageous for the user to be able to see the cutting edge 26 as he files. Thus, a view opening 30 is provided in the reference plate 10 and as noted from FIG. 2 exposes the cutting edge 26.

The file guide stays in place on the chain by reason of the lugs 12 (one on each side of the chain) which allows only limited movement of the file guide while the file is worked against the cutting edge 26. Because the file is held down in the gullet and because it is slideably secured to the file guide (preventing movement except linearly along the file length), the file guide is prevented from forward or rearward movement (relative to the chain length).

For most sharpening applications, the cutting edge 26 will be in a horizontal plane (with the chain oriented in a vertical plane) and the plate 10 is thus merely kept in a horizontal plane during sharpening. The cutting edge 26 (including that portion of the edge continued around the corner) is designed to conform to the round file. It is important that the position of the file be carefully maintained relative to this cutting edge to achieve proper sharpening. Too deep or too shallow sharpening will either dull the edge or make it too aggressive. Thus, the metal collets have a diameter close to the diameter of the file and the axis defined by the metal collets is carefully positioned relative to the plane defined by the bottom surface 10b of the plate 10 (or rather that portion of the surface 10b engaging the two reference points, i.e., the depth gauge and saw chain top plate).

Obviously with the form of file guide illustrated, the file guide position is fixed and thus different chain types will require different file guides. For the file guide that is illustrated, the file intersects the reference plane of surface 10b and thus it is necessary to provide a groove 32 in the surface 10b between the collets 16.

It will be understood that those skilled in the art, with knowledge of the present invention, will be able to devise modifications and other embodiments without departing from the scope of the invention, which modifications and other embodiments are accordingly encompassed in the claims appended hereto.

What is claimed is:

1. A file guide for filing the cutting edge of a cutting link of a saw chain wherein said cutting link is comprised of a top plate having a leading cutting edge and a depth gauge separated from the top plate by a gullet, said file guide comprising; a reference plate having a bottom surface, two spaced planar surfaces provided by said bottom surface, one of said spaced planar surfaces being adapted to rest on the depth gauge of the saw chain cutting link and the other spaced planar surface adapted to rest on the top plate of the saw chain cutting link, a pair of lugs depending from said bottom surface and defining a chain receiving channel therebetween, each of said lugs having an opening and the openings being in alignment with each other for cooperatively receiving and guiding in a predetermined path an elongated round file, said planar surfaces and lug openings being interrelated to selectively locate a file guided within said openings relative to the cutting edge of the saw chain cutting link.

2. A file guide as defined in claim 1 wherein the openings in the lugs are lined with wear resistant collets.

3. A file guide as defined in claim 1 wherein the reference plate has a central opening therethrough for viewing the cutting edge of the top plate being sharpened.

4. A file guide as defined in claim 1 wherein the top surface of the reference plate has guide lines for aligning the file with the cutting edge of the top plate being sharpened.

5. A file guide for filing the cutting edge of a cutting link of a saw chain wherein said cutting link is comprised of a top plate having a leading cutting edge and a depth gauge separated from the top plate by a gullet, said file guide comprising; a reference plate having a bottom surface, two spaced planar surfaces provided by said bottom surface, one of said spaced planar surfaces being adapted to rest on the depth gauge of the saw chain cutting link and the other spaced planar surface adapted to rest on the top place of the saw chain cutting link, a pair of lugs depending from said bottom surface and defining a chain receiving channel therebetween, each of said lugs having an opening and the openings being in alignment with each other and lined with wear resistant collets for cooperatively receiving and guiding in a predetermined path an elongated round file, said planar surfaces and lug openings being interrelated to selectively locate a file guided within said openings relative to the cutting edge of the saw chain cutting link and said reference plate having a central opening therethrough for viewing the cutting edge of the top plate being sharpened, and said reference plate having guidelines for aligning the file with the cutting edge of the top plate being sharpened.

* * * * *